Feb. 23, 1960    A. R. FOREST    2,925,668
INSURANCE PROGRAM COMPUTER
Filed Aug. 1, 1956    3 Sheets-Sheet 1

INVENTOR.
ALEXANDER R. FOREST
BY
Kenyon & Kenyon
ATTORNEYS

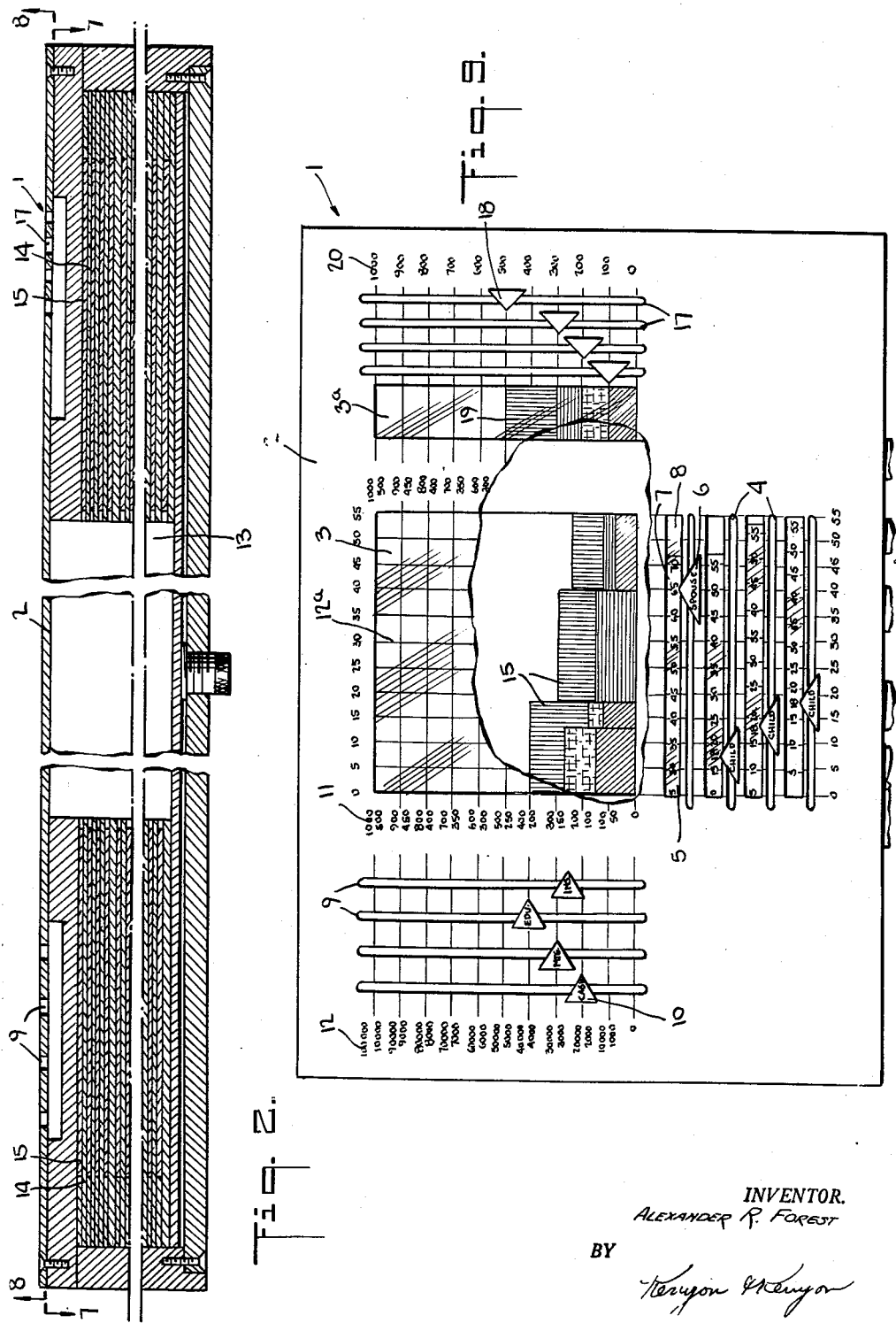

Feb. 23, 1960  A. R. FOREST  2,925,668
INSURANCE PROGRAM COMPUTER
Filed Aug. 1, 1956  3 Sheets-Sheet 3

INVENTOR.
ALEXANDER R. FOREST
BY
Kenyon & Kenyon
ATTORNEY

United States Patent Office 2,925,668
Patented Feb. 23, 1960

2,925,668

INSURANCE PROGRAM COMPUTER

Alexander R. Forest, New York, N.Y.

Application August 1, 1956, Serial No. 601,463

3 Claims. (Cl. 35—24)

This invention relates to a calculating device and more particularly to a device adapted to visually present the calculation of an insurance program based upon given facts.

Any integrated insurance program whether it be for an individual, group or otherwise is difficult to compute and once computed it is difficult to present the calculations to an insurance prospect in an understandable fashion. Further, there is a steadily growing trend within the insurance industry away from policies written for specific purposes, like mortgage coverage, burial expenses, education costs for children, etc. Instead, the writing of comprehensive policies representing insurance programming is encouraged. Not only are such all-inclusive policies less expensive in the long run, but a more thorough and better balanced coverage is achieved. At present a common procedure for an insurance salesman working on a life insurance program is to make at least two calls on the prospective customer. On the first call the pertinent data is collected and a tentative proposal made. On the second call the computation of a proposed insurance program is submitted accompanied by a color chart illustrating the program. This two-call system is time consuming, it allows a time interval during which the customer can become disinterested and the presentation of the computation is apt to be complex and difficult to follow and understand. Another common method used which saves time and does not allow the customer time to become disinterested is the one-call method. The salesman using this method attempts to collect the data from the prospective customer, calculate an integrated program and present the results practically simultaneously in an attempt to write the policy on the first call. It will be readily appreciated that this method may be less enlightening to the prospective customer and the highly effective aid of the color chart used in the two-call method will be denied the salesman. Thus, neither of the above commonly used methods can be said to possess the optimum effectiveness.

It should be appreciated that the words "insurance program" as used herein mean an integrated overall plan of insurance coverage which is adapted to provide for all of the party's insurance needs and does not refer to the simpler, single objective type of insurance sale, such as an insurance policy to cover a house mortgage in case of death, which is satisfactorily handled by the above methods or systems.

The present invention provides a device which is adapted to compute and visually present an insurance program during a single call on a prospective customer. Further, besides being graphic, the presentation is accurate, easily understood and complete. All of the drawbacks of the present methods are eliminated.

It is an object of the present invention to provide an insurance program calculating device which is compact and can be easily carried by an insurance salesman.

Another object is to provide such a device which is adapted to visually present an insurance program picture that is developed in an interesting manner at the same time the prospective customer is disclosing the pertinent facts to the insurance salesman.

A further object is to provide an insurance computing device that is adapted to present in graphic form an easily understood, very complete, insurance program to a prospective customer during the course of a single call.

Other advantages of this invention will be realized from a reading of the following description in conjunction with the attached drawings, wherein:

Fig. 2 is a cross-sectional view taken on lines 2—2 of Fig. 1;

Fig. 9 is a partially cut away plan view of the device showing it in operation.

Figure 1:
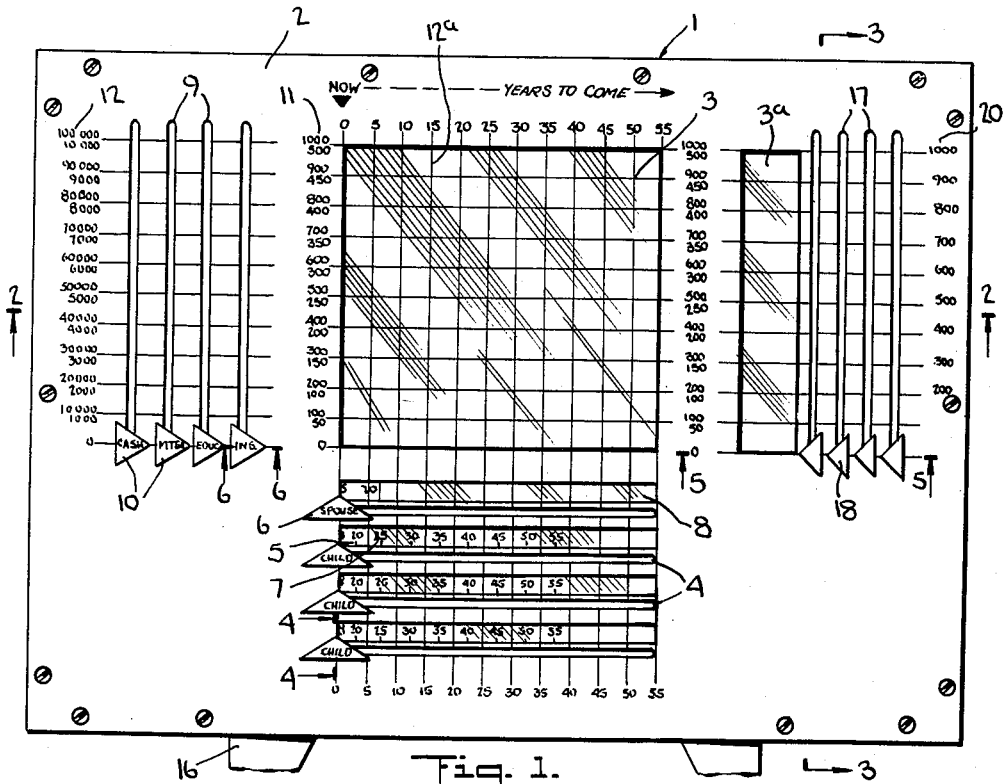
Fig. 1 is a top plan view of an embodiment of the invention.
Figure 3:
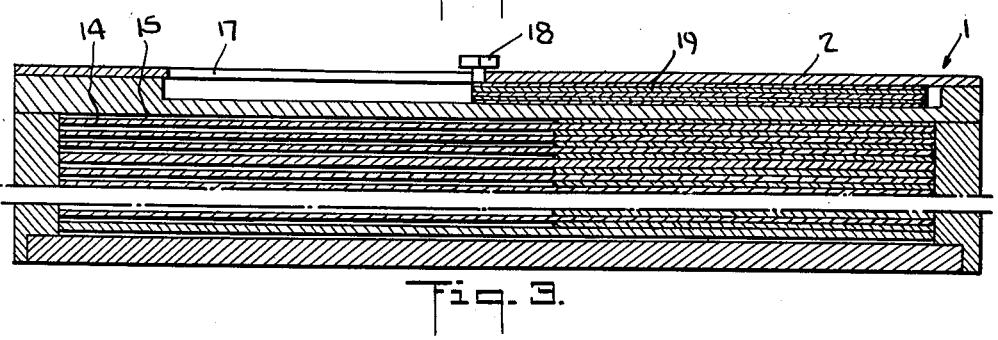
Fig. 3 is a cross-sectional view taken on lines 3—3 of Fig. 1.
Figure 4:
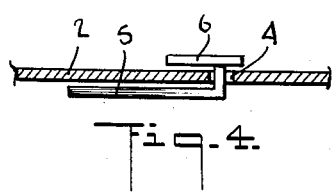
Fig. 4 is a partial cross-sectional view taken on lines 4—4 of Fig. 1.
Figure 5:
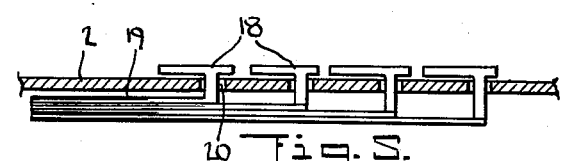
Fig. 5 is a partial cross-sectional view taken on lines 5—5 of Fig. 1.
Figure 6:
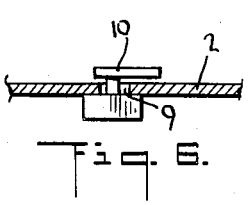
Fig. 6 is a partial cross-sectional view taken on lines 6—6 of Fig. 1.
Figure 7:
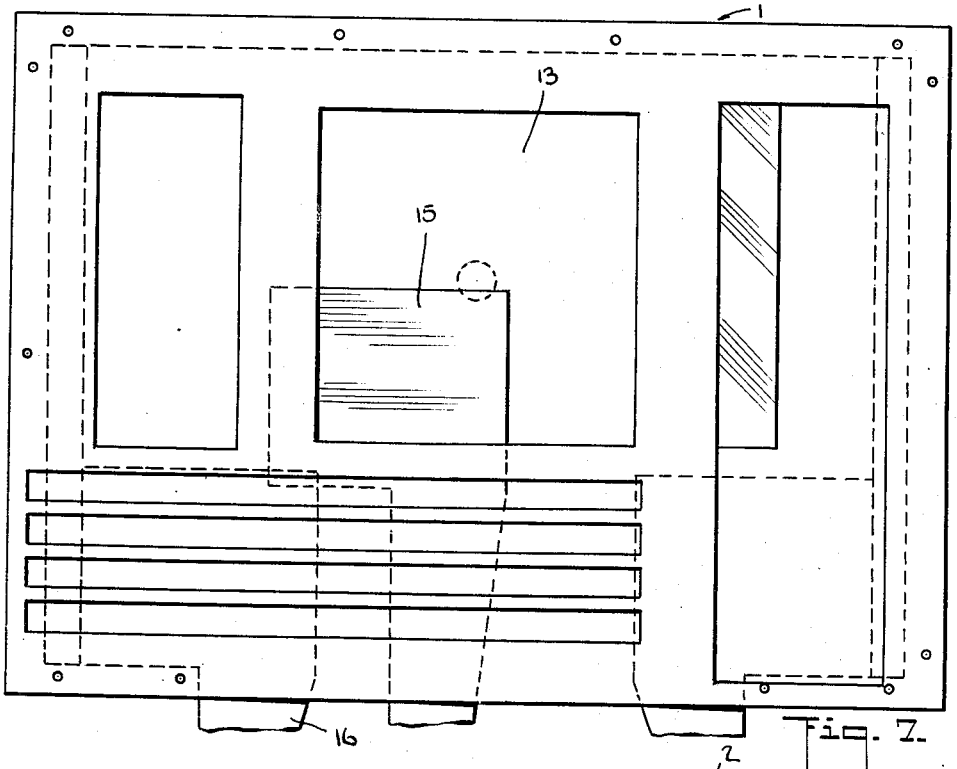
Fig. 7 is a view taken on lines 7—7 of Fig. 2.
Figure 8:
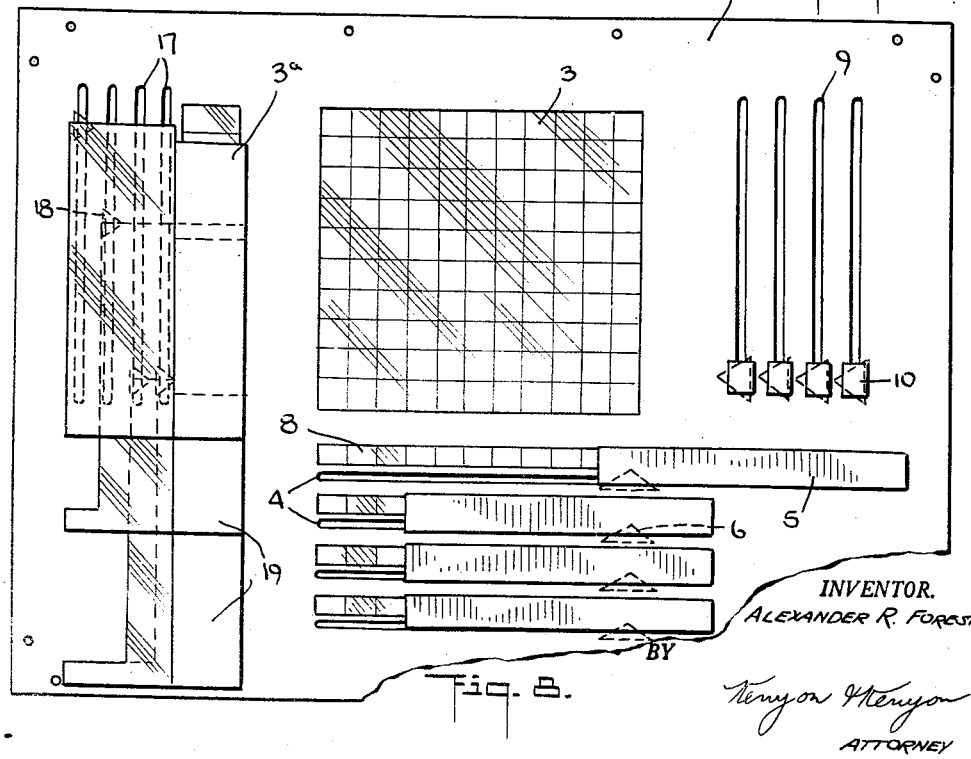
Fig. 8 is a partially cut away view taken on lines 8—8 of Fig. 2.

Although the following description is directed to an embodiment of the present invention adapted for the computation of an insurance program for an individual it should be recognized that other embodiments may be adapted to compute group insurance plans and other similar insurance plans. Further embodiments may be adapted to compute other programs such as pension funds, stock dividend plans, retirement plans, sale of radio and television time, etc.

As shown the device may be housed in an eight sided box indicated generally at 1. The top 2 of this box has at least one window or opening 3 plus an optional second window 3a formed therein and the other components associated with these windows are adapted to compute and visually present an insurance program within the periphery of the windows 3 and 3a. As will become apparent the top 2 may be supported on a frame or other similar support rather than being supported by the box 1.

Adjacent one side of the larger window or opening 3 are a plurality of tracks 4 formed in the top 2 substantially parallel to the side of this window. A slide 5 having an indicator 6 attached thereto is disposed below each of these tracks 4. Each slide 5 also has indicia 7 on the upper surface thereof which can be seen through openings or windows 8 formed in the top 2.

A second series of tracks 9 are formed in the top 2 substantially parallel to a second edge of the window 3. A pointer 10 is slidably mounted on each of these tracks 9. Also, a series of indicia 11 are disposed adjacent at least one edge of the window 3 which may be complemented by other indicia 12 extending along either the first or second tracks 4, 9. The spacing of these indicia may be carried across the window by a plurality of lines forming a grid 12a in the plane of the window if desired.

Beneath the window 3 a well 13 is formed and a plurality of superimposed shelves 14 are disposed between said well and at least one upright side of the box 1. A plurality of tabs 15 are slidably positioned between these shelves 14 each tab having a handle 16 extending outside the box 1. These tabs 15, of differing colors or shades, as shown, are thus adapted to be moved into or out of the well area beneath the window 3 as desired and within this area they can be moved freely transversely and longitudinally, the shelves 14 being so spaced as to permit this free movement of any selected tab 15 without disturbing any other tab.

A second window or opening 3a may be formed in the top 2. In connection with this second window a plurality of slots 17 are formed in the top 2 substantially parallel to an edge of this window, each slot having a slidable marker 18 extending therethrough. The inside end of each of these markers 18 is attached to a separate panel 19 slidably mounted below the marker and extending from the marker to the left beneath the window 3a. Each of these panels 19 is preferably of a different color, as shown, and each of them is mounted in a different plane so that they may be slid by one another as desired. Indicia 20 may be provided adjacent the slots 17.

Having thus described the physical make-up of an embodiment of the device the manner of using this invention will now be described. Referring to Fig. 9 a hypothetical computation is visually presented by the device much as it may be shown by the device itself by an insurance salesman. In this hypothetical case, the salesman, in a question and answer session, has obtained the pertinent insurance data from the customer and has in the presence of the client manipulated the multicolored tabs 15 and panels 19 to the positions shown beneath windows 3 and 3a respectively to visually present an insurance program to the customer.

The data collected in this instance is listed below.

Question: Answer
1. Cash required for last expenses _____ $3,000.00
2. Mortgage _____ 10,000.00
3. Educational requirements for children_ 12,000.00
4. Amount of insurance carried—
   a. NSLI insurance _____ 10,000.00
   b. Other life insurance _____ 40,000.00

As the insurance salesman asks these questions, he moves the pointers 10 adjacent the left adjoining edge of the window 3 in the order of the questions asked to corresponding positions. The pointer closest to window 3 showing the designation "INS" is so placed as to indicate $50,000. The insurance salesman thereupon points out to the prospect that since $25,000 are earmarked for last expenses, the mortgage and educational requirements for the children, only $25,000 will be available for programming purposes. He, accordingly, moves the pointer with the inscription "INS" to the position opposite $25,000.

Next, the insurance salesman would ask.

Question: Answer
Age of spouse, nearest birthday _____ 25.
Age of the three children, nearest birthday _____ 10, 4 and 1.
Desired retirement income per month _ $500.00.

Using the above listed information the insurance salesman would first move the indicators 6 and associated slides 5 to the positions shown in Fig. 9. Starting from the top in Fig. 9, the age of the spouse being 25, the indicator marked "Spouse" is moved to the right until the indicia 7 on the slide begins to show "25." This indicator will then automatically point to the vertical line on grid 12a which will indicate the year when the widow will be eligible for social security at age 65.

The next indicator 6 marked "Child" is similarly moved with its corresponding slide 5 until the indicia "10" shows. This indicator marked "Child" will then automatically point to the vertical line on window 3 which will indicate the year when the child will be 18 and no longer subject to social security. The other two indicators are similarly moved to correspond with the ages of the other two children.

When the lines of these indicators 6 and pointers 10 are extended within the periphery of the window 3 they define areas which are significant from an insurance standpoint since they indicate the graphic area in time covered by social security benefits. Conversely, they also delineate the areas where no social security benefits would be available. By manipulating the red tabs 15 the insurance salesman blocks out an area which corresponds to the amount of monthly insurance payments which the insurance prospect considers necessary to maintain the household in the event of his premature death. In the example the prospect indicates a need for $400 cash a month, as long as the children are under 18 years of age; $300 a month thereafter, until the widow is 65 and becomes subject to social security and $250 from the time she is 65 for as long as she will live. The above mentioned needs can then be blocked out by the red tabs 15 in window 3.

Next the applicable Social Security benefits, in the form of the green tabs 15, are used to block out a portion of the area previously blocked out by the red tabs. It will be noted that after the youngest child reaches 18 there will be no Social Security payments until the spouse reaches the age of 65. The NSLI insurance payments have been arbitrarily spread over the period until the youngest child reaches 18 and are shown by means of the yellow tabs 15 which again block out a further portion of the area previously blocked out by the red tabs. The blue tabs 15 indicate the payments that would be received from the other life insurance at present held by the prospect and these again block out portions of the area previously blocked out by the red tabs.

After these tabs have been moved into these positions—and all of these movements require only a few minutes during a single call on a prospective customer—the red tab area that is left exposed in the window 3 visually shows the customer the periods of time and amounts that are needed to round out his insurance program and the salesman can readily compute in a matter of minutes using his basic tables of settlement options the amount of added insurance that is needed to take care of these exposed red areas. Thus the prospect, in a very brief call, can be shown the computation of his particular insurance program giving the salesman an opportunity to convince the customer that further insurance should be purchased to take care of the exposed red areas. It will also be appreciated that the manipulation of the indicators, pointers, and tabs can be done while the customer is supplying the required data and in an interesting manner which will focus attention of the prospective customer and further increase his interest in his particular insurance program. It will be further appreciated that the insurance salesman can dispense with the usual routine of working with pen and paper which often tends to distract the attention of the prospective customer.

A prospective customer will also desire a retirement program as a part of his over-all insurance program. Still using the data set forth in the table above and referring to Fig. 9 the customer's attention is directed to the second window 3a. The amount of monthly retirement income ($500) is indicated by positioning the marker 18 having a red panel 19 connected thereto opposite the "500" indicia 20. The customer's monthly Social Security payments block out a portion of this red area in the form of a green panel 19; the customer's NSLI insurance additively blocks out a further portion of the red panel in the form of a yellow panel 19; and the customer's present insurance additively blocks out still a further portion of the red area in the form of a blue panel 19. Once again the remainder of the red panel 19 which has not been blocked out or covered visually represents the need for further insurance to provide for the desired amount of monthly retirement income. It will be appreciated that the insurance that provides for the window 3 red area as previously computed may well provide for this window 3a red area as well and thus the integration and comparison of these two computations on a single device is very advantageous.

Thus, the salesman is provided with a device which makes it possible for him to visually present an integrated, over-all insurance program to a customer and all of the steps taken to make this presentation can be accurately carried out in the presence of the customer in an interesting manner to further stimulate his interest.

It will be appreciated that other embodiments of this invention may use different combinations of interacting elements to adapt these embodiments for the presentation of additional or different data depending upon the situation. An illustration of another embodiment is a device having curved windows, similar to the window in front of many current automobile speedometers, below which the tabs can be shifted about pivot points to define areas showing insurance coverage and areas showing the need for such coverage.

Having thus described my invention I claim:

1. An insurance program computer comprising a box having a rectangular top, a rectangular window disposed in said top, a plurality of tracks extending substantially parallel to a first edge of said window, an indicator slide having an identifying symbol thereon slidably attached to each of said tracks, a series of indicia extending adjacent said tracks adapted to define settings of said indicator slides in accordance with the insurance requirements of the program being computed, a plurality of second tracks extending substantially parallel to a second adjacent edge of said window, a pointer slidably attached to each of said second tracks each having a symbol thereon identifying a party to be provided for by the insurance program, a series of indicia extending adjacent each of said second tracks and adapted to be moved parallel thereto which define the settings of said pointers in accordance with the ages of said parties, whereby said indicator slides and pointers may be moved to defined positions to indicate areas within said window which define insurance program data, a well in said box disposed beneath the window, one side of said box having a plurality of substantially parallel superimposed shelves formed therein which extend intermediate said side and said well, a plurality of tabs of different colors slidably disposed between said shelves and a handle attached to each tab extending outside the box whereby said tabs can be selectively moved into the areas defined by the indicator slides and pointers to graphically present insurance program data.

2. An insurance program computer comprising a box, a window disposed in the top of said box, at least one track extending substantially parallel to the first edge of said window, an indicator slide having an identifying symbol thereon slidably attached to each of said tracks, a series of indicia extending adjacent said tracks adapted to define settings of said indicator slides in accordance with the insurance requirements of the program being computed, at least one second track extending substantially parallel to a second adjacent edge of said window, a pointer slidably attached to each of said second tracks each having a symbol thereon identifying a party to be provided for by the insurance program, a series of indicia extending adjacent each of said second tracks which define the settings of said pointers in accordance with the ages of said parties, whereby said indicator slides and pointers may be moved to defined positions to indicate areas within said window which define insurance program data, a well in said box disposed beneath the window, a plurality of tabs of different colors slidably disposed within said well and a handle attached to each tab extending outside the box whereby said tabs can be selectively moved into the areas defined by the indicator slides and pointers to graphically present insurance program data.

3. An insurance program computer comprising a box, a window disposed in said box, at least one indicator slidably attached along one edge of said window adapted to define insurance requirements data of the program being computed, at least one pointer slidably attached along a second adjacent edge of said window adapted to define data relating to the parties to be provided for by the insurance program, whereby said indicators and pointers are adapted to indicate areas within said window which define insurance program data, a plurality of tabs slidably disposed beneath said window and a handle attached to each tab extending outside the box whereby said tabs can be selectively moved into the areas defined by the indicators and pointers to graphically present insurance program data.

References Cited in the file of this patent

UNITED STATES PATENTS

| | | |
|---|---|---|
| 2,097,835 | Epps | Nov. 2, 1937 |
| 2,484,058 | Steinberger | Sept. 11, 1949 |
| 2,584,511 | Stockfleth | Feb. 5, 1952 |
| 2,601,196 | Willis | June 17, 1952 |

FOREIGN PATENTS

| | | |
|---|---|---|
| 716,695 | Germany | June 13, 1942 |